(12) United States Patent
Lee

(10) Patent No.: US 9,047,011 B2
(45) Date of Patent: Jun. 2, 2015

(54) APPARATUS AND METHOD FOR PROVIDING A DYNAMIC USER INTERFACE IN CONSIDERATION OF PHYSICAL CHARACTERISTICS OF A USER

(75) Inventor: Ho-Sub Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 13/222,640

(22) Filed: Aug. 31, 2011

(65) Prior Publication Data

US 2012/0317520 A1    Dec. 13, 2012

(30) Foreign Application Priority Data

Jun. 10, 2011    (KR) ................ 10-2011-0056178

(51) Int. Cl.
*G06F 3/033* (2013.01)
*G06F 3/048* (2013.01)
*G06F 3/0488* (2013.01)

(52) U.S. Cl.
CPC .................. *G06F 3/04886* (2013.01)

(58) Field of Classification Search
CPC ......... G06F 3/033; G06F 3/041; G06F 5/048; G09G 5/00
USPC ....................................... 715/773
See application file for complete search history.

(56) References Cited

U.S. PATENT DOCUMENTS

| | | | |
|---|---|---|---|
| 8,151,217 B2 | 4/2012 | Lin | |
| 2009/0146964 A1* | 6/2009 | Park et al. | 345/173 |
| 2010/0073311 A1* | 3/2010 | Yeh | 345/173 |
| 2010/0085317 A1* | 4/2010 | Park et al. | 345/173 |
| 2010/0175025 A1* | 7/2010 | Lin | 715/811 |
| 2010/0271200 A1* | 10/2010 | Leuthardt et al. | 340/539.12 |
| 2012/0036468 A1* | 2/2012 | Colley | 715/773 |
| 2012/0166995 A1* | 6/2012 | McAleer | 715/773 |
| 2012/0287056 A1* | 11/2012 | Ibdah | 345/173 |

FOREIGN PATENT DOCUMENTS

| | | |
|---|---|---|
| CN | 101442584 A | 5/2009 |
| CN | 101458590 A | 6/2009 |
| CN | 101639738 A | 2/2010 |
| CN | 101770323 A | 7/2010 |
| CN | 101770339 A | 7/2010 |
| CN | 101907921 A | 12/2010 |
| JP | 2004-326498 | 11/2004 |
| JP | 2010-020601 | 1/2010 |
| KR | 10-2005-0044965 | 5/2005 |
| KR | 10-2006-0091073 | 8/2006 |

(Continued)

OTHER PUBLICATIONS

Lee, Hosub et al. "Fit Your Hand: Personalized User Interface Considering Physical Attributes of Mobile Device Users" ACM User Interface Software and Technology (Oct. 2011) pp. 59-60.

(Continued)

*Primary Examiner* — William Bashore
*Assistant Examiner* — Jeanette J Parker
(74) *Attorney, Agent, or Firm* — NSIP Law

(57) ABSTRACT

Provided are an apparatus and method for providing a user interface and a terminal employing the same. The apparatus is capable of dynamically changing a graphical object according to the physical characteristics of a user or in an effort to prevent muscle stress to the user.

8 Claims, 12 Drawing Sheets

(56) References Cited

FOREIGN PATENT DOCUMENTS

| KR | 10-2009-0022037 | 3/2009 |
|---|---|---|
| KR | 10-2010-0048374 | 5/2010 |

OTHER PUBLICATIONS

Gajos, Krzysztof Z et al. "Decision-Theoretic User Interface Generation." Association for the Advancement of Artificial Intelligence, vol. 8 (Jul. 2008) pp. 1532-1536.

Himberg, Johan et al. "On-line Personalization of a Touch Screen Based Keyboard" Proceedings of the 8$^{th}$ international conference on intelligent user interfaces. ACM (Jan. 2003) pp. 77-84.

Lee, Hosub et al. "An Adaptive User Interface Based on Spatiotemporal Structure Learning" IEEE 49.6 (May 2011) pp. 118-124.

Chinese Office Action issued on Aug. 4, 2014 in counterpart Chinese Application No. 201210162630.X (18 pages and full English translation).

* cited by examiner

FIG. 4A

| A 00 | A 01 | A 02 | A 03 | A 04 |
|------|------|------|------|------|
| A 10 | A 11 | A 12 | A 13 | A 14 |
| A 20 | A 21 | A 22 | A 23 | A 24 |
| A 30 | A 31 | A 32 | A 33 | A 34 |
| A 40 | A 41 | A 42 | A 43 | A 44 |

FIG. 4B

| 13 | 12 | 3  | 2  | 5  |
|----|----|----|----|----|
| 3  | 10 | 9  | 13 | 16 |
| 5  | 7  | 22 | 18 | 14 |
| 1  | 12 | 20 | 10 | 17 |
| 4  | 13 | 15 | 5  | 12 |

FIG. 5C

| A 00 | A 01 | A 02 | A 03 | A 04 |
|------|------|------|------|------|
| A 10 | A 11 | A 12 | A 13 | A 14 |
| A 20 | A 21 | A 22 | A 23 | A 24 |
| A 30 | A 31 | A 32 | A 33 | A 34 |
| A 40 | A 41 | A 42 | A 43 | A 44 |

|  6.5 | 20.8 |  14  |  17  |  12  |
|------|------|------|------|------|
|  2   | 16.9 | 23.4 |  10  |  5   |
|  3   |  9   | 28.6 |  26  | 19.5 |
|  12  |  10  |  7   |  12  | 16.9 |
|  13  |  3   |  5   |  1   |  4   |

=

| 1.3 | 1.3 |  1  |  1  |  1  |
|-----|-----|-----|-----|-----|
|  1  | 1.3 | 1.3 |  1  |  1  |
|  1  |  1  | 1.3 | 1.3 | 1.3 |
|  1  |  1  |  1  |  1  | 1.3 |
|  1  |  1  |  1  |  1  |  1  |

X

|  5  |  16 |  14 |  17 |  12 |
|-----|-----|-----|-----|-----|
|  2  |  13 |  18 |  10 |  5  |
|  3  |  9  |  22 |  20 |  15 |
|  12 |  10 |  7  |  12 |  13 |
|  13 |  3  |  5  |  1  |  4  |

APPARATUS AND METHOD FOR PROVIDING A DYNAMIC USER INTERFACE IN CONSIDERATION OF PHYSICAL CHARACTERISTICS OF A USER

CROSS-REFERENCE TO RELATED APPLICATION(S)

This application claims the benefit under 35 U.S.C. §119 (a) of Korean Patent Application No. 10-2011-0056178, filed on Jun. 10, 2011, in the Korean Intellectual Property Office, the entire disclosure of which is incorporated herein by reference for all purposes.

BACKGROUND

1. Field

The following description relates to a user interface (UI) technology.

2. Description of the Related Art

Various devices such as smart phones, tablets, computers, and the like, include a touch screen instead of a conventional key pad as an intuitive input interface. Some devices have the capability to install and use various types of applications in addition to built-in applications previously installed thereon.

Typically, a user tends to move icons of the most frequently used applications to the top page of a displayed screen or to an easy-to-touch position on the screen. However, because this relocation is manually achieved, the same operation needs to be performed each time applications are added/deleted. In addition, the more applications there are, the more difficult the task of managing the applications.

When a user uses a touch screen to input commands, joints of a human body may become worn down. Such an inputting through a touch provides a user with amusement and convenience, but requires a movement of the fingers and the wrist. In some instances, long hours of use of a touch pad of a device may cause Carpal Tunnel Syndrome.

That is, while mobile terminals provide the portability and the easiness to input commands via a touch screen, stress on the hands and joints of a user may occur due to the finger movement while a user grasps the device with tips of the fingers. Because the touch pads devices such as smart phones and tablet PCs typically require complicated and sophisticated finger movements in comparison to the manipulation of the conventional key pad, such finger movements may exert a significant amount of pressure on fingers and wrist joints. For example, a nerve leading from an arm to a hand may be consistently compressed by ligaments, thereby causing a user to experience numbness or grasping power weakness. In some cases, this state may cause tendons of fingers to be enlarged, leading to a pain each time the fingers move.

Various medical professionals suggest some preventive measures that include reducing the amount of time spent using a mobile terminal and various stretching exercises for joints. However, it is not easy for many users, who rely on the mobile terminals for various functions, to is reduce the amount of time that they use a mobile device. In addition, many users are unaware of the risk factors to their health that may occur from prolonged use of a touch screen of a mobile device.

SUMMARY

In one general aspect, there is provided an apparatus for providing a dynamic user interface, the apparatus including an acquiring unit configured to acquire touch information about a user touching a touch screen, a first estimation unit configured to estimate an optimum touch region of the touch screen in consideration of physical characteristics of the user based on the touch information, and a first control unit configured to display a predetermined graphical object on the touch screen based on the optimum touch region.

The touch information may comprise at least one of touch count information or touch frequency information for each region of the touch screen, and start position information and end position information about a continuous touch.

The first estimation unit may be configured to calculate a first touchability level for each region of the touch screen based on the touch count information or the touch frequency information, and estimate the optimum touch region based on the calculated first touchability level of each region.

The first estimation unit may be configured to calculate a first touchability level for each region of the touch screen based on the touch count information or the touch frequency information, determine a weight assigning region from among regions of the touch screen according to the start position information and the end position information about the continuous touch, calculate a second touchability level for each region by selectively assigning a weight to the determined weight assigning region, and estimate the optimum touch region based on the calculated second touchability level of each region.

The first estimation unit may be further configured to determine whether the user is right-handed or left-handed based on a gradient of the continuous touch, which is obtained based on the start position information and the end position information about the continuous touch, and to determine the weight assigning region based on the result of the determination.

The first control unit may be configured to display a shortcut icon or a function button of an application that has a preference that exceeds a threshold value, on the optimum touch region.

The apparatus may further comprise a second estimation unit configured to estimate whether stress is being caused on joints of the user due to a touch operation, based on the touch information, and a second control unit configured to relocate the graphical object that is being displayed on the touch screen, in response to the second estimation unit estimating that the stress is being caused.

In another aspect, there is provided a method for providing a dynamic user interface, the method including acquiring touch information about a user touching a touch screen, estimating an optimum touch region of the touch screen in consideration of physical characteristics of the user based on the touch information, and displaying a predetermined graphical object based on the optimum touch region.

The method may further comprise estimating whether stress is being caused on joints of the user due to a touch operation, based on the touch information, and relocating the graphical object that is being displayed on the touch screen, in response to estimating that the stress is being caused.

In another aspect, there is provided an apparatus for providing a dynamic user interface, the apparatus including an acquiring unit configured to acquire touch information about a touch screen of a user, an estimation unit configured to estimate whether stress is being caused on joints of the user due to touch operation, based on the touch information, and a control unit configured to relocate the graphical object that is being displayed on the touch screen, in response to determining that the stress is being caused.

The touch information may comprise at least one of touch count information or touch frequency information for each region of the touch screen, and start position information and end position information about a continuous touch.

The estimation unit may be configured to determine whether the number of times a user touches a region exceeds a predetermined threshold value based on the touch information, and estimate whether stress is being caused on joints of the user according to a result of the determination.

The control unit may be configured to relocate the graphical object to prevent stress from being caused on the joints of the user.

In another aspect, there is provided a method for providing a dynamic user interface, the method including acquiring touch information about a user touching a touch screen, estimating whether stress is being caused on joints of the user due to a touch operation, based on the touch information, and relocating the graphical object being displayed on the touch screen, if the stress is caused.

In another aspect, there is provided a terminal including a touch screen configured to display a graphical object, and a user interface (UI) providing unit configured to estimate an optimum touch region of the touch screen based on physical characteristics of a user that manipulates the touch screen, and to display the graphical object based on the estimated optimum touch region.

The UI providing unit may comprise an acquiring unit configured to acquire touch information including at least one of touch count information or touch frequency information for each region of the touch screen, and start position information and end position information about a continuous touch, an estimation unit configured to calculate a first touchability level for each region based on the touch count information or the touch frequency information for each region of the touch screen, and to estimate the optimum touch region based on the calculated first touchability level, and a control unit configured to display a shortcut icon or a function button of an application that has a preference that exceeds a threshold value, on the optimum touch region.

After the first touchability level is calculated, the estimation unit may be further configured to determine a weight assigning region among the respective regions of the touch screen based on an average start position and an average end position about the continuous touch, calculate a second touchability level for each region by selectively assigning a weight to the determined weight assigning region, and estimate the optimum touch region based on the calculated second touchability level.

Other features and aspects may be apparent from the following detailed description, the drawings, and the claims.

BRIEF DESCRIPTION OF THE DRAWINGS

FIGS. 4A to 4C are diagrams illustrating examples of a method for estimating an optimum touch region.

FIGS. 5A to 5D are diagrams illustrating other examples of a method for estimating an optimum touch region.

Figure 1:
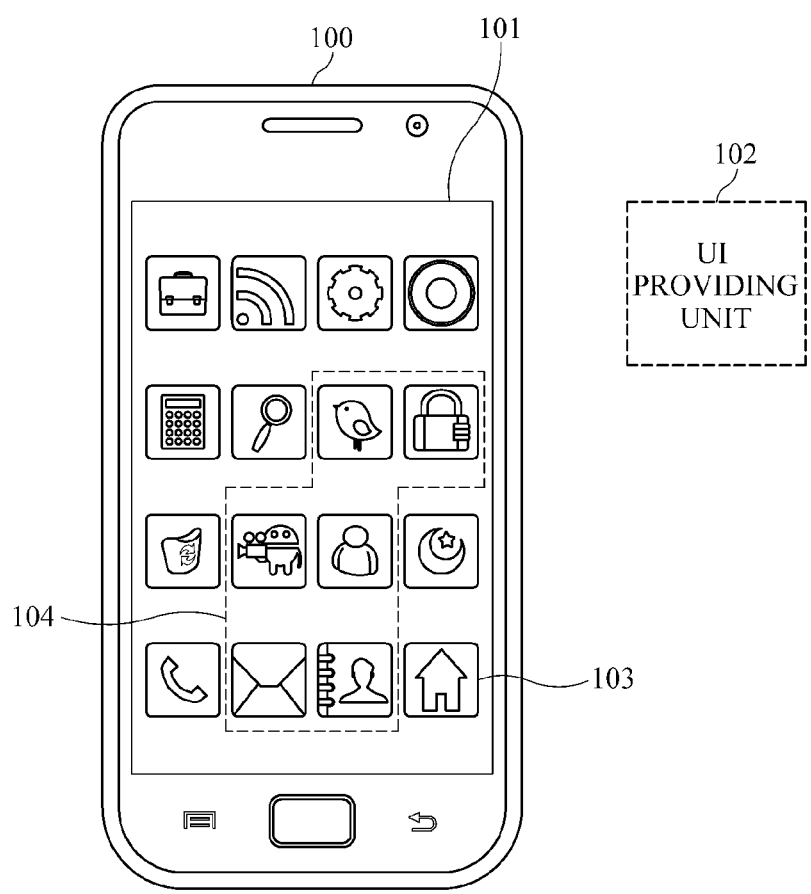
FIG. 1 is a diagram illustrating an example of a terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a terminal.

Referring to FIG. 1, terminal 100 may be a device such as a Portable Multimedia Players (PMP), Personal Digital Assistants (PDA), a smart phone, a tablet, a computer, an MP3 Player, a home appliance, a television, and the like. A user may use the terminal 100 by touching a display screen of the terminal 100. For example, the terminal 100 may include a touch screen 101 and a user interface (UI) providing unit 102.

A graphical object 103 is displayed on the touch screen 101. For example, the graphical object 103 may be a function button or a shortcut icon that is used to operate the terminal 100 or an application that is installed on the terminal 100. A user of the terminal 100 may execute an application or may control functions of the application by touching the graphical object 103 that is displayed on the touch screen 101.

The UI providing unit 102 may control a graphical effect of the touch screen 101 such that the graphical object 103 is displayed on a predetermined region of the touch screen 101. For example, the UI providing unit 102 may be formed using a hardware and/or a software scheme inside the terminal 100. That is, while illustrated outside of the terminal 100, the UI providing unit 102 may be included in the form of hardware, software, or a combination thereof, within the terminal 100.

The UI providing unit 102 may estimate an optimum touch region of the touch screen 101 in consideration of physical characteristics of a user who manipulates the touch screen 101. Accordingly, the UI providing unit 102 may display the graphical object 103 based on the estimated optimum touch region 104. For example, if a user is right-handed, it may be easier for the user to touch a graphical object disposed at a lower right of the touch screen. In this example, the UI providing unit 102 may display a frequently used graphical object 103 on the lower right of the touch screen 101.

As another example, if a user of the terminal 100 repeats the same operation while manipulating the touch screen 101, the UI providing unit 102 may activate an alarm or change the arrangement of the graphical object 103 to prevent stress from occurring to joints of the user. By activating an alarm or by rearranging the arrangement of the graphical object 103, the UI providing unit 102 may cause a manipulation pattern of the user to change, thereby reducing the stress caused on the joints of the user due to repetitive operations.

Figure 2:
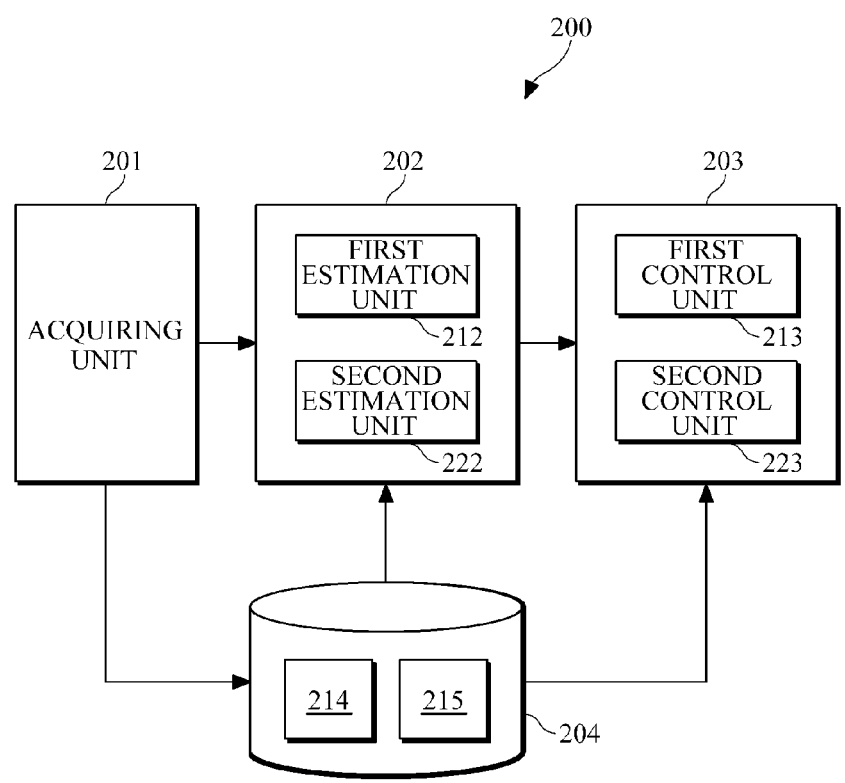
FIG. 2 is a diagram illustrating an example of a dynamic user interface apparatus.

FIG. 2 illustrates an example of a dynamic user interface apparatus. For example, one or more of the elements of the dynamic user interface apparatus shown in FIG. 2 may form the UI providing unit 102 shown in FIG. 1.

Referring to FIG. 2, dynamic user interface apparatus 200 includes an acquiring unit 201, an estimation unit 202, a control unit 203, and a storage unit 204.

The acquiring unit 201 may acquire touch information about a touch screen of a user. The touch information about a touch screen may represent various types of input information that are provided when a user manipulates a touch screen. For example, the touch information may include a touch position (or coordinates), a number or frequency of touches for each region of the touch screen, a start position and an end position about a continuous touch, a direction and speed of a continuous touch, and the like. In various examples, the continuous touch represents a touch operation that remains in contact with the touch screen from a first touch position to a second touch position. That is, the touch operation may represent a touch operation in which a finger of the user is continuously detected on the touch screen while moving from a first touch position to a second touch position. For example, a drag operation is an example of the continuous touch.

The acquiring unit 201 may store the acquired touch information in the storage unit 204. For example, the acquired touch information may be continuously stored in a touch information storage unit 214. The touch information stored in the touch information storage unit 214 may serve as basic data that is used to infer a manipulation pattern or physical characteristics of a user.

The acquiring unit 201 may acquire execution information about an application that is currently being executed in the terminal or execution information about functions of the application, and may store the acquired execution information in the storage unit 204. For example, the acquired execution information such as execution history of applications may be continuously stored in an execution information storage unit 215. The execution information that is stored in the execution information storage unit 215 may serve as basic data that is used to infer a user-preferred application or function, or a frequently used application or function.

In the example of FIG. 2, the estimation unit 202 includes a first estimation unit 212 and a second estimation unit 222. Also, the control unit 203 includes a first control unit 213 and a second control unit 223.

For example, the first estimation unit 212 may estimate the optimum touch region of the touch screen in consideration of physical characteristics of a user. For example, the first estimation unit 212 may receive touch information and/or execution information from the acquiring unit 201, and may estimate various characteristics such as a frequently touched region, whether the user is right-handed or a left-handed, a preferred or frequently used graphical object, and the like.

While estimating an optimum touch region in consideration of the physical characteristics, the first estimation unit 212 may calculate a predetermined touchability level and generate the optimum touch region based on the calculated touchability level. This example uses two types of touchability levels including a first touchability level and a second touchability level. In this example, the first touchability level is a value that is related to the number or frequency of touches for each region of the touch screen. The second touchability level is a value that is obtained by assigning a predetermined weight to the first touchability level in consideration of the direction of the continuous touch.

Hereinafter, an example of a method of determining the optimum touch region by use of the first touchability level is described.

The first estimation unit 212 may divide the touch screen into a plurality of cells and count the number or frequency of touches for each cell. The number of touches represents the number of times a user has touched a predetermined cell over a predetermined period of time. The frequency of touches represents a ratio of the number of touches for a predetermined cell with respect to the total number of touches. For example, a user may touch a touch screen ten times by touching a first cell and a second cell three times and seven times, respectively. In this example, the frequency of touches for the first cell is 0.3, and the frequency of touches for the second cell is 0.7.

The first estimation unit 212 may calculate the first touchability level for each cell in is proportion to the counted number or frequency of touches. For example, the first estimation unit 212 may assign a higher first touchablity level to a cell that has a higher number or frequency of touches. For example, the first estimation unit 212 may extract cells that have a first touchability level that exceeds a predetermined threshold value, and estimate a set of the extracted cells as an optimum touch region.

Hereinafter, an example of a method of determining the optimum touch region by use of the second touchablity level is described.

If the first touchability level for each region is obtained as described above, the first estimation unit 212 may determine cells which are to be assigned weights, based on an average start position and an average end position of a continuous touch. For example, a predetermined weight may be assigned to the first touchability level. The weight may be selectively assigned only to the first touchability level of a cell, which is determined to be assigned the weight, thereby calculating the second touchablity level for each cell. The first estimation unit 212 may extract cells that have a second touchability level that exceeds a predetermined threshold value, and estimate a set of the extracted cells as the optimum touch region.

Examples of the calculation of the touchability level and the estimation of the optimum touch region are further described with reference to FIGS. 5A-5D.

If the optimum touch region is estimated by the first estimation unit 212, the first control unit 213 may display a graphical object on the optimum touch region. For example, the first control unit 213 may display a shortcut icon or a function button of an application that is preferred or frequently used by a user, on the optimum touch region. Information about the application that is preferred or frequently used by a user may be determined based on the execution information that is stored in the execution information storage unit 215.

As described herein, the optimum touch region may be determined in consideration of the physical characteristics of the user, and the graphical object that has a higher user preference may be displayed on the determined optimum touch region, so that the user may more conveniently use various kinds of applications or their functions.

The second estimation unit 222 may estimate whether stress is caused on joints of a user due to a touch operation, based on the touch information acquired by the acquiring unit 201. For example, if a user continually touches a predetermined position of the touch screen, the second estimation unit 222 may compare the number of touches with a predetermined threshold value, and if the number of touches exceeds the threshold value, the second estimation unit 222 may determine that stress is being caused on joints of the user due to the repetitive touch operation.

The second control unit 223 may relocate the graphical object that is displayed on the touch screen according to the result of the estimation by the second estimation unit 222, or may activate an alarm. For example, if the user keeps continues to touch a position of the touch screen for more than a predetermined number of times, a graphical object displayed on the corresponding position may be moved to another position, thus causing the user to change the hand and finger position thereby relieving the stress on the joints by inducing a different touch behavior. As another example, the second control unit 223 may activate an alarm, thereby signaling the user to perform a different touch gesture.

As described herein, if the same pattern of touch gesture is repeated, the graphical object may be relocated or an alarm may be activated, thereby attempting to relieve the potential stress caused by the user's repetitive touch behaviors.

In FIG. 2, the first estimation unit 212 and the second estimation unit 222 are illustrated as separate modules. However, the configuration of the first estimation unit 212 and the second estimation unit 222 is not limited thereto. For example, the first estimation unit 212 and the second estimation unit 222 may be formed of a single module in a software aspect, a hardware aspect, or a combination thereof. Similarly, the configuration of the first control unit 213 and the second control unit 223 shown as separate modules in FIG. 2 is not limited thereto, and may be formed of a single module in a software aspect, a hardware aspect, or a combination thereof.

Figure 3A:
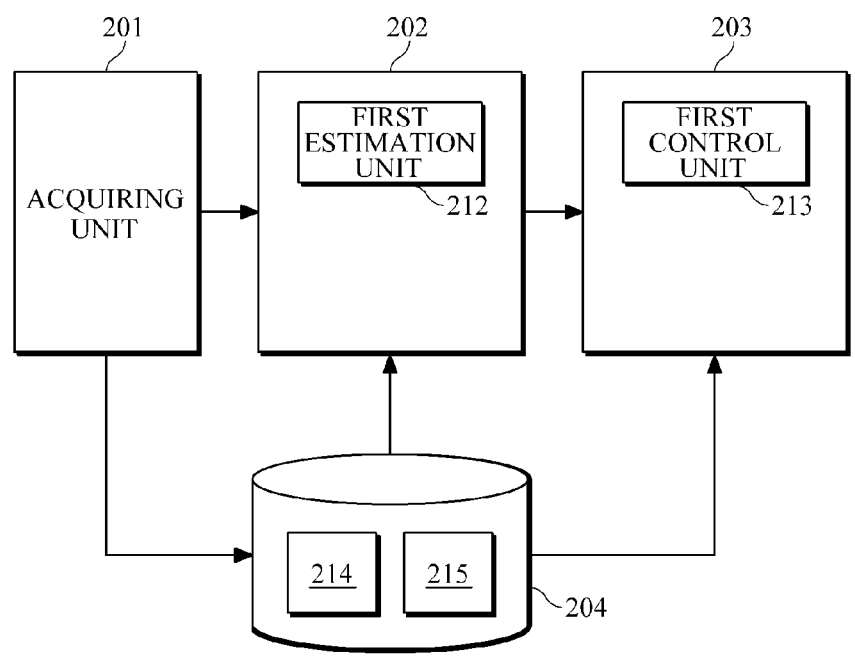
FIGS. 3A and 3B are diagrams illustrating other examples of a dynamic user interface apparatus.
Figure 3B:
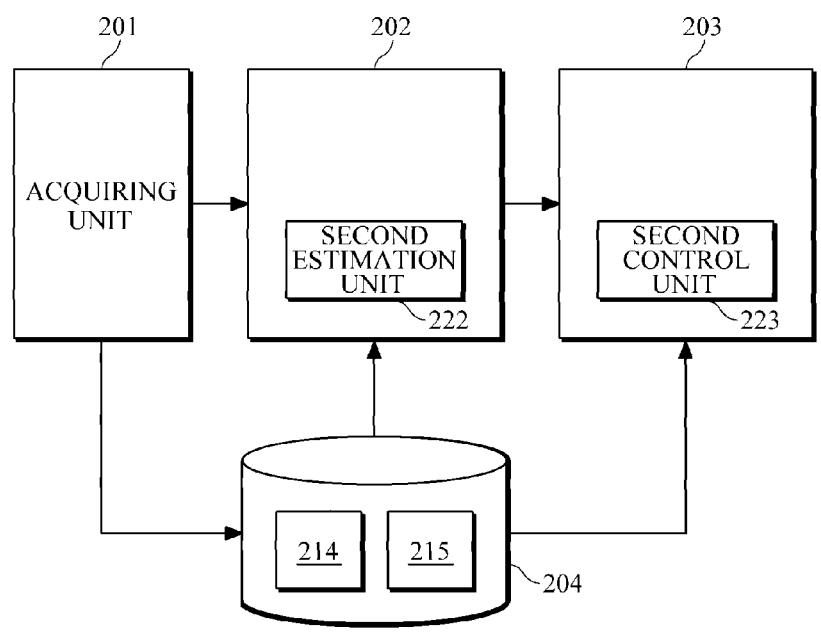

FIGS. 3A and 3B illustrate another example of a dynamic user interface apparatus.

In the previous example of the dynamic user interface shown in FIG. 2, the estimation unit 202 includes the first estimation unit 212 and the second estimation unit 222, and the control unit 203 includes the first control unit 213 and the second control unit 223. However, the dynamic user interface is not limited thereto, and may be implemented using various parts of the above configuration.

For example, the estimation unit 202 may include only one of the first estimation unit 212 and the second estimation unit 222 instead of both. Similarly, the control unit 203 may include only one of the first control unit 213 and the second control unit 223 instead of both.

That is, as shown in FIG. 3A, the dynamic user interface apparatus may be implemented using the configuration shown in FIG. 2 without the second estimation unit 222 and the second control unit 223. As another example, as shown in FIG. 3B, the dynamic user interface apparatus may be implemented using the configuration shown in FIG. 2 without the first estimation unit 212 and the first control unit 213.

Figure 4C:
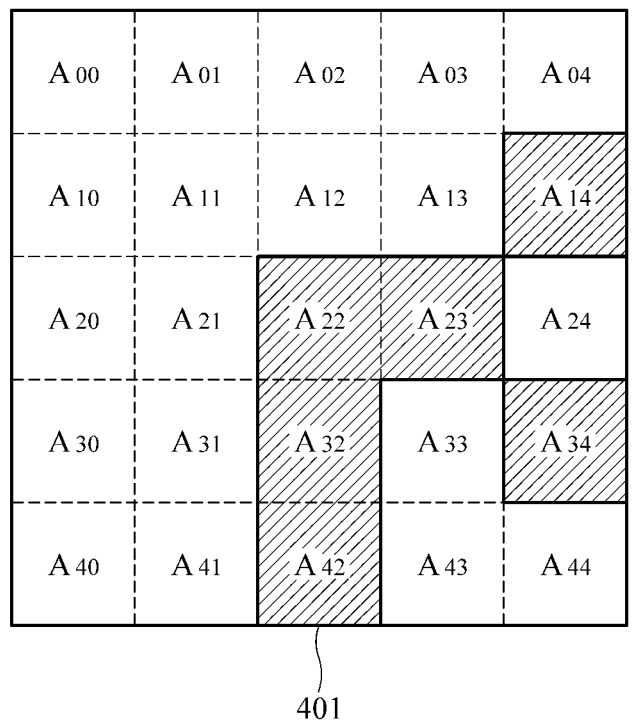

FIGS. 4A to 4C illustrate examples of a method for estimating an optimum touch region.

Referring to FIG. 4A, the estimation unit (202 in FIG. 2) divides the region of a touch screen into cells. In this example, the estimation unit 202 divides the touch screen region into cell $A_{00}$ through $A_{44}$. In the example of FIG. 4A, the cells are equal in size and encompass the entire screen. However, it should be appreciated that the cells may not be the same in size and/or that the cells do not encompass the entire screen.

Then, the acquiring unit (201 in FIG. 2) may acquire the number and/or the frequency of touches for each cell, and may convert the acquired number and/or frequency of touches for each cell into a first touchability level. For example, the estimation unit 202 may place priorities on each cell based on the number of touches, and may assign a first touchability level to each cell based on the priorities.

For example, in FIG. 4B, the numbers that are shown in each cell indicate a first touchability levels for each cell. In FIG. 4B, cell $A_{22}$ has the highest first touchability level, indicating that cell $A_{22}$ is the most frequently touched by a user.

After the first touchability level of each cell is calculated, the estimation unit 202 may compare the first touchability level with a predetermined threshold value, and may select a cell having a first touchablity level that exceeds the threshold value. For example, if the threshold value is 15, the cells $A_{14}$, $A_{22}$, $A_{23}$, $A_{32}$, $A_{34}$ and $A_{42}$ are selected. In this example, the cells that have a first touchability level exceeding the threshold value are selected, and the estimation unit 202 estimates a region corresponding to the selected cells as the optimum touch region.

As can be seen in FIG. 4C, the estimation unit 202 may estimate a region including the cells $A_{14}$, $A_{22}$, $A_{23}$, $A_{32}$, $A_{34}$ and $A_{42}$ as the optimum touch region 401.

FIGS. 5A to 5D illustrate other examples of a method for estimating an optimum touch region. In FIGS. 5A to 5D, a weight is selectively assigned to the first touchability level of each cell to calculate a second touchability level and the optimum touch region is determined based on the second touchability level.

Figure 5A:
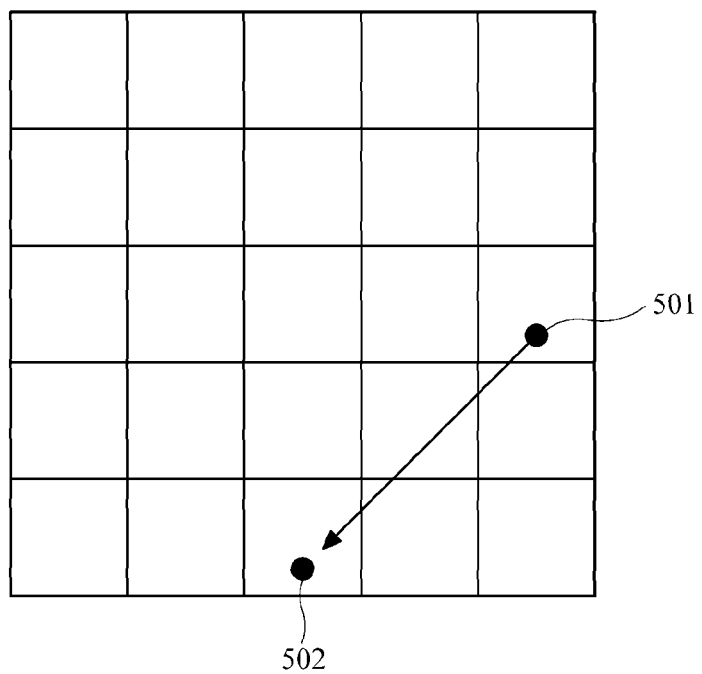

Referring to FIGS. 2 and 5A, the estimation unit 202 may receive a start position 501 and an end position 502 of a continuous touch from the acquiring unit 201. The estimation unit 202 may calculate the gradient and direction of the continuous touch based on the start position 501 and the end position 502, and may store the calculated gradient and direction in the storage unit (204 in FIG. 2). In this example, the gradient of the continuous touch is represented by the gradient of a line connecting the start point 501 to the end point 502. In this case, the estimation unit 202 may record a continuous touch that has a gradient within a predetermined range as a valid continuous touch. For example, because a continuous touch with a gradient approximating 0 forms a nearly parallel line, such a continuous touch may not be suitable for being used as a data to determine the direction of continuous touch and may be excluded from valid continuous touches.

The estimation unit 202 may classify gradients of the valid continuous touches that are accumulated for a predetermined period of time, into a positive value and a negative value and compile the statistics. For example, if the number of positive values exceeds the number of negative values, the user may be estimated as being right-handed, and if the number of negative values exceeds the number of positive values, the user may be estimated as being left-handed.

That is, if the result of statistics on the gradient shows that the number of positive values of gradients is greater, the user may be regarded as a right hander, and if the continuous touch is achieved from the upper left side to the lower right side, that is, a negative value of a gradient is made, the user may be estimated as a left hander.

The estimation unit 202 may perform filtering on the continuous touches according to the result of determination of the user being right-handed or left-handed, and calculate an average start position and an average end position of a continuous touch. For example, if the user is a right hander, a continuous touch having a negative value of gradient may be excluded for calculating an average start position and an average end position of continuous touch. The estimation unit 202 may generate a line connecting the calculated average start position to the calculated average end position.

Figure 5B:
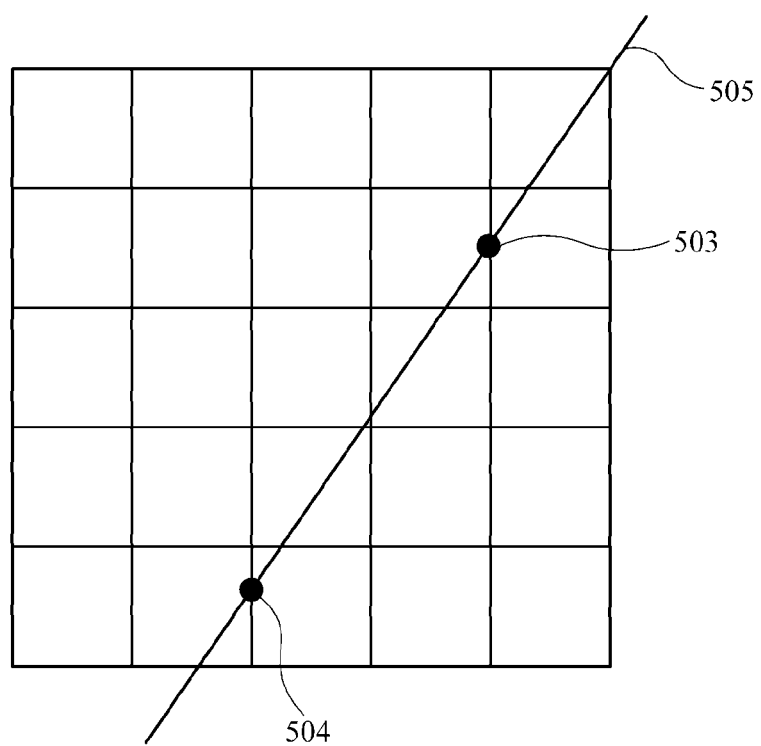

For example, as shown in FIG. 5B, the estimation unit 202 acquires an average start position 503 and an average end position 504 of the valid continuous touches, and generates a line 505 that connects the average start position 503 to the average end position 504.

The estimation unit 202 may determine cells that are disposed along the line 505 as weight assigning cells. For example, as shown in FIG. 5C, the cells $A_{04}$, $A_{13}$, $A_{14}$, $A_{22}$, $A_{23}$, $A_{32}$, $A_{41}$ and $A_{42}$ may be determined as weight assigning cells.

If the weight assigning cells are determined, the estimation unit 202 may obtain second touchability levels by selectively assigning weights to the first touchability levels, which have been obtained as shown in FIG. 4B.

For example, it is assumed that a weight is 1.3 as shown in FIG. 5D, and the weight of 1.3 is multiplied by the first touchability level. In this example, the weight of 1.3 may be multiplied only by a predetermined cell that has been determined as a weight assigning cell. For example, cell $A_{03}$ has a first touchability level of '2' and does not correspond to a weight assigning cell. Accordingly, the cell $A_{03}$ has a second touchability level of '2'. However, the cell $A_{04}$ has a first touchability level of '5' and corresponds to a weight assigning cell. Accordingly, the cell $A_{04}$ has a second touchability level '6.5' with a weight of '1.3' assigned thereto. That is, cell $A_{04}$ has a second touchability level of '6.5' by multiplying the first touchability level of '5' by the weight of '1.3.'

If the second touchability level is obtained, the estimation unit 202 may compare the second touchability level with a predetermined threshold value to estimate the optimum touch region. For example, in FIG. 5D, if a threshold value is 15, a region including the cells $A_{13}(16.9)$, $A_{14}(20.8)$, $A_{22}(28.6)$, $A_{23}(23.4)$, $A_{32}(26)$, $A_{34}(17)$, $A_{41}(16.9)$ and $A_{42}(19.5)$ is estimated as the optimum touch region.

It should be appreciated that the method of weighting is not limited to the above example, and may be implemented using various schemes. For example, in addition to the method using a line connecting the average start potion to the average end position, the weighting may be achieved by setting a region of a looped curve including the average start position and the average end position. Also, the threshold value may vary.

Figure 6:
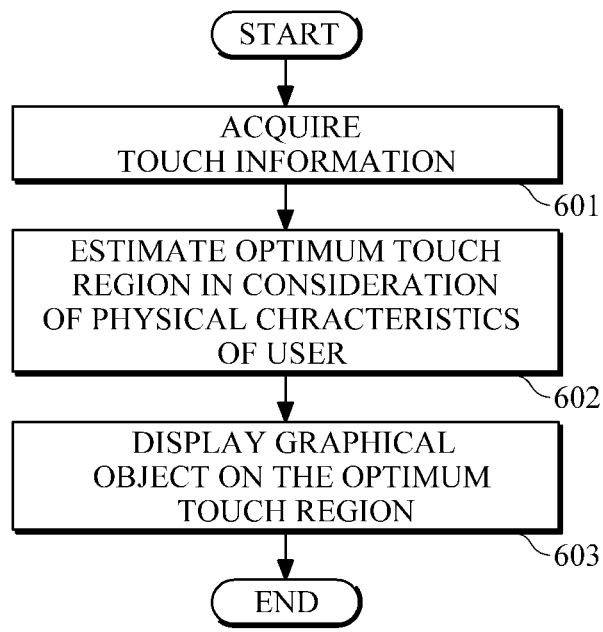
FIG. 6 is a diagram illustrating an example of a method for providing a dynamic user interface.

FIG. 6 illustrates an example of a method for providing a dynamic user interface.

Referring to FIGS. 2 and 6, the acquiring unit 201 acquires touch information (601). For example, the touch information may include a touch position (or coordinates), the number and/or frequency of touches for each of regions of the touch screen, a start position and an end position about a continuous touch, the direction and speed of a continuous touch, and the like.

The estimation unit 202 estimates the optimum touch region in consideration of physical characteristics of users (602). As shown in the examples of FIGS. 4A to 4C, the estimation unit 202 may estimate the optimum touch region based on the frequency of touches and the first touchablity level for each region of the touch screen. As another example, as shown in FIGS. 4A to 4C and 5A to 5D, the estimation unit 202 may estimate the optimum touch region based on the frequency of touches for each region of the touch screen, the direction of a continuous touch, and the first touchablity level and the second touchability level.

The control unit 203 displays a graphical object on the estimated optimum touch region (603). For example, the control unit 203 may display application icons or function buttons, corresponding to applications that are frequently used or preferred by a user, on the estimated optimum touch region.

As another example, the preference about graphical objects may be mapped to the touchability level in the optimum touch region such that a graphical objet that has a high preference may be disposed on the region that has a high touchability level.

As another example, the graphical object to be disposed on the optimum touch region may be a graphical object related to a recently installed application, in addition to a frequently used graphical object or a preferred graphical object. As another example, the graphical object to be disposed on the optimum touch region may be set manually by a user of the device.

The arrangement of the graphical object disposed on the optimum touch region may be changed in consideration of the physical characteristics of a user such that the user may more conveniently manipulate the graphical object. For example, sliding a predetermined graphical object in one direction is a common way of canceling a holing state of a smart phone. However, if the user is estimated as being right-handed based on the start position and the end position of a continuous touch, the sliding may be set to be achieved from the left side to the right side, and if the user is estimated as being left-handed, the sliding may be set to be achieved from the right side to the left side.

As described herein, a graphical object corresponding to an application that has a high preference to a user may be displayed on an easy-to-use position based on the physical characteristics of the user, thereby improving the convenience for a user using a user interface.

Figure 7:
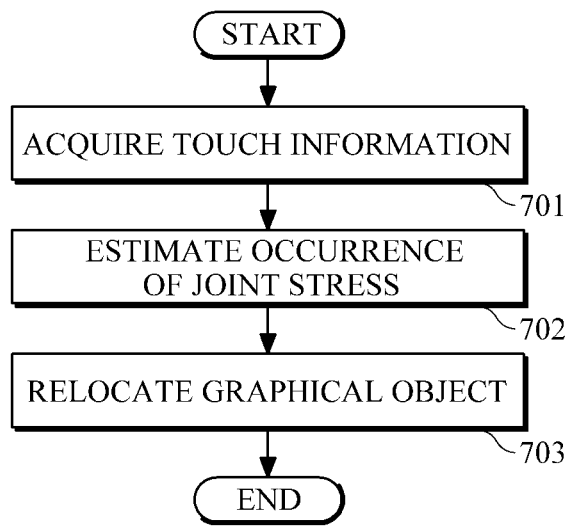
FIG. 7 is a diagram illustrating another example of a method for providing a dynamic user interface.

FIG. 7 illustrates another example of a method for providing a dynamic user interface.

Referring to FIGS. 2 and 7, the acquiring unit 201 acquires touch information (701). For example, the touch information may include a touch position (or coordinates), the number and/or frequency of touches for each of regions of the touch screen, a start position and an end position about a continuous touch, a direction and speed of a continuous touch, and the like.

The estimation unit 202 estimates whether stress is caused on joints of a user (702). For example, the estimation unit 202 may divide the touch screen into a plurality of cells and if number of repetitive touches performed by a same touch behavior exceeds a predetermined threshold value, the estimation unit 202 may estimate that a stress is caused on joints of a user.

If a result of estimation in operation 702 is that a stress is caused on joints of a user, the control unit 203 relocates the graphical object (703). For example, in FIG. 4A, if a user repeatedly touches a graphical object on the cell $A_{22}$ a number of times that exceeds a predetermined threshold value, the control unit 203 may move the graphical object that is being displayed on the $A_{22}$ to another region, for example, the cell $A_{40}$, thereby causing the user to change his/her pattern of touch gestures.

As another example, if a result of estimation of operation 702 is that a stress is caused on joints of a user, the control unit 203 may activate an alarm. The alarm may be an alarming sound or an alarming text that is displayed on the screen.

As described in this example, if an operation causing stress on joints is repeated above a predetermined threshold value, a different touch operation may be induced, thereby enhancing the health of a user.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations is are within the scope of the following claims.

The invention claimed is:

1. An apparatus for providing a dynamic user interface, the apparatus comprising:
 a touch screen configured to display graphical objects;
 an acquirer configured to acquire touch information about a user touching a touch screen, wherein the touch information comprises a first touch information and a second touch information;
 a first estimator configured to estimate an optimum touch region of the touch screen in consideration of physical characteristics of the user based on the touch information,
 wherein the first estimator is configured to
 calculate a first touchability level for each region of the touch screen based on the first touch information,
 wherein the first touch information comprises at least one of touch count information, and touch frequency information for each region of the touch screen,
 calculate a second touchability level for each region by selectively assigning a predetermined weight to the first touchability level according to the second touch information,
 wherein the second touch information comprises start position information and end position information about a continuous touch, and
 estimate the optimum touch region based on the calculated second touchability level of each region; and
 a first controller configured to display a predetermined graphical object on the touch screen based on the optimum touch region.

2. The apparatus of claim 1,
 wherein the first estimator is further configured to determine whether the user is right-handed or left-handed based on a gradient of the continuous touch,
 which is obtained based on the start position information and the end position information of the continuous touch, and
 to determine the weight assigning region based on the result of the determination.

3. The apparatus of claim 1,
 wherein the first controller is configured to display a shortcut icon or a function button of an application that has a preference that exceeds a threshold value on the optimum touch region.

4. The apparatus of claim 1, further comprising:
 a second estimator configured to estimate whether stress is being caused on joints of the user due to a touch operation, based on the touch information; and
 a second controller configured to relocate the graphical object that is being displayed on the touch screen, in response to the second estimator estimating that the stress is being caused.

5. A method for providing a dynamic user interface, the method comprising:
 acquiring touch information about a user touching a touch screen, wherein the touch information comprises a first touch information and a second touch information;
 estimating an optimum touch region of the touch screen in consideration of physical characteristics of the user based on the touch information
 wherein the estimating comprises
 calculating a first touchability level for each region of the touch screen based on the first touch information,
 wherein the first touch information comprises at least one of touch count information, and touch frequency information for each region of the touch screen,
 calculating a second touchability level for each region by assigning a predetermined weight to the first touchability level according to the second touch information,
 wherein the second touch information comprises start position information and end position information about a continuous touch, and
 estimating the optimum touch region based on the calculated second touchability level of each region; and
 displaying a predetermined graphical object based on the optimum touch region.

6. The method of claim 5, further comprising:
 estimating whether stress is being caused on joints of the user due to a touch operation, based on the touch information; and relocating the graphical object that is being displayed on the touch screen, in response to estimating that the stress is being caused.

7. A terminal comprising:

a touch screen configured to display a graphical object; and a user interface (UI) provider configured to estimate an optimum touch region of the touch screen based on physical characteristics of a user who manipulates the touch screen, and to display the graphical object based on the estimated optimum touch region, wherein the UI provider comprises an acquirer configured to acquire a touch information including a first touch information and a second touch information, and an estimator configured to calculate a first touchability level for each region based on the first touch count information, wherein the first touch information comprises at least one of touch count information, and touch frequency information for each region of the touch screen, to calculate a second touchability level for each region by assigning a predetermined weight to the first touchability level according to the second touch information, wherein the second touch information comprises start position information and end position information about a continuous touch, and to estimate the optimum touch region based on the calculated second touchability level of each region.

8. The terminal of claim 7, wherein the UI provider further comprises:

a controller configured to display a shortcut icon or a function button of an application that has a preference that exceeds a threshold value, on the optimum touch region.

* * * * *